United States Patent [19]
Wusirika

[11] Patent Number: 4,719,091
[45] Date of Patent: Jan. 12, 1988

[54] PREPARATION OF MONO-SIZED ZIRCONIA POWDERS BY FORCED HYDROLYSIS

[75] Inventor: Raja R. Wusirika, Painted Post, N.Y.

[73] Assignee: Corning Glass Works, Corning, N.Y.

[21] Appl. No.: 880,804

[22] Filed: Jul. 1, 1986

[51] Int. Cl.[4] ............................................. C01G 25/02
[52] U.S. Cl. .................................... 423/82; 423/85; 423/266; 423/608; 501/103; 501/104
[58] Field of Search .................. 423/82, 85, 266, 608; 501/103, 104

[56] References Cited

U.S. PATENT DOCUMENTS

| | | | |
|---|---|---|---|
| 3,312,631 | 4/1967 | Smith | 252/301.1 |
| 3,334,962 | 8/1967 | Clearfield | 423/608 |
| 4,365,011 | 12/1982 | Bernard et al. | 423/608 |

FOREIGN PATENT DOCUMENTS

| | | | |
|---|---|---|---|
| 8172233 | 10/1983 | Japan | 423/608 |
| 9107969 | 6/1984 | Japan | 423/608 |
| 9111922 | 6/1984 | Japan | 423/608 |
| 0215527 | 10/1985 | Japan | 423/608 |
| 1175871 | 8/1985 | U.S.S.R. | 423/608 |

OTHER PUBLICATIONS

"Monodispersed Metal (Hydrous) Oxides-A Fascinating Field of Colloid Science", Egon Matijevic, Acc. Chem. Res. 1981, 14, pp. 22-29.
"Wet-Chemical Preparation of Zirconia Powders: Their Microstructure and Behavior", M.A.C.G. Van de Graaf and A. J. Burggraaf, p. 744.
"Microstructural Development During Pressing and Sintering of Ultra Fine Zirconia Powders", M.A.C.G. Van de Graaf et al., Ceramic Powders, p. 783, (1983).
"Technique for Preparing Highly-Sinterable Oxide Powders", Dole et al., 32 Materials Science and Engineering 277, (1978).
"The Preparation of Zirconia Powders", C. J. Norman and S. L. Jones, Convention Papers.
"Characteristics and Sintering Behavior of Zirconia Ultra-Fine Powders", K. Haberko, 5 Ceramurgia Int. 148, (1979).

Primary Examiner—Patrick P. Garvin
Assistant Examiner—Paige C. Harvey
Attorney, Agent, or Firm—R. N. Wardell; G. H. Levin

[57] ABSTRACT

Substantially spherical mono-sized particles of zirconia can be prepared by the forced hydrolysis of an aqueous solution of zirconyl chloride. A zirconyl chloride solution having a molarity up to about 0.4 is heated for at least 72 hours at a temperature of at least 95° C. to generate suspended particles of hydrated zirconium oxide, which are recovered and calcined to provide the mono-sized zirconia powders. In preferred embodiments, mono-sized powders of a mixture of zirconia with one or more of its stabilizing metal oxides is prepared by precipitating the metal in the form of its hydroxide onto pre-formed zirconium-containing particles.

12 Claims, No Drawings

PREPARATION OF MONO-SIZED ZIRCONIA POWDERS BY FORCED HYDROLYSIS

BACKGROUND OF THE INVENTION

This invention relates to a method of producing zirconia powders by the forced hydrolysis of zirconyl chloride and more particularly to a method for producing powders having a uniform sub-micron particle size.

Finely divided powders of zirconia or mixtures of zirconia with one of its stabilizing oxides are useful in the preparation of ceramic or refractory articles having such diverse applications as catalyst supports, filters, extrusion dies or nozzles, protective linings, etc. Particularly useful in the general production of ceramic articles are powders which are highly dense and substantially spherical and which have a relatively uniform, sub-micron, particle size. Ceramic materials, and particularly zirconia powders, having these characteristics tend to sinter at lower temperatures, saving time and energy in the production of ceramic articles based thereon, and can provide greater strength and structural integrity to those articles. In ceramic production, the ceramic powders are normally molded or pressed into a desired shape, the so-called "green" shape, or are tape cast, followed by sintering at elevated temperatures to fuse the powders with the purpose of producing a coherent and strong body. Pressing and sintering of dense spherical particles of substantially uniform sub-micron size is desirable to provide the needed strength to the articles. If low-density particles, those having internal pores or voids, are used, excessive shrinkage of the material can occur during sintering, which can reduce the strength and increase the likelihood of cracking in the final article. Use of irregularly-shaped or large particles tends to leave larger void spaces after packing or pressing in the green state, which can weaken the final ceramic body and increase its susceptibility to cracking. Uniformity of particle size is also desirable to prevent localized exaggerated grain growth, which can result during sintering when the particle size distribution is not narrow. A typically large grains, which can grow as a result, can cause flaws that adversely effect strength.

The ability to form zirconia powders having these particle characteristics, without the need to mill or grind the material, is also commercially important. Grinding and milling often provide irregularly-shaped particles, and not only are expensive but also unavoidably introduce impurities into the powder.

It has already been shown that the production of sub-micron or colloidal mono-sized particles of various hydrated metal oxides can be obtained by forced hydrolysis. See "Monodispersed Metal (Hydrous) Oxides", E. Matijevic, *Acc. Chem. Res.*, Vol. 14, 22–29 (1981). In that article, it is shown that maintaining acidified solutions of metal salts at elevated temperatures for definite periods of time can produce the desired metal oxide particles. It is there disclosed that the preparation of uniform particles depends upon the controlled generation of precipitating solute so that only a single "burst" of nuclei occurs and that further solute formation does not manifest itself in secondary nucleation but rather in diffusion onto the particles existing from the original nucleation. The original nuclei, accordingly, grow uniformly to yield monodispersed systems. The use of forced hydrolysis is difficult, however, because the conditions of salt concentration, pH, anion nature, temperature, etc. that are required for this controlled solute generation lie in a very narrow range. Although the discovery of the correct parameters has permitted application of forced hydrolysis in the production of monodispersed sols of, for example, alumina and hematite (iron oxide), the production of monodispersed zirconia through this procedure has not heretofore been attained.

SUMMARY OF THE INVENTION

The present invention provides a method for producing zirconia in the form of substantially spherical powder particles having a mean particle size of about 0.05 to 0.2 micron with a geometric standard deviation of about 30% or less. The method comprises providing an aqueous solution of zirconyl chloride having a molarity up to about 0.4; heating the solution at a temperature of at least 95° C. for a period of at least 120 hours, or at substantially equivalent conditions of time and temperature, to generate solid particles therein of hydrated zirconium oxide; recovering the solid material; and calcining the recovered material at a temperature of at least about 400° C. for a time sufficient to produce the zirconia powder.

In preferred embodiments, the zirconia powder is surface-coated with a precipitate of one of its stabilizing oxides, notably yttria, calcia, or magnesia. In one such embodiment, the calcined zirconia particles are dispersed or suspended in an aqueous acidic solution of a metal salt of one of the above metals. A sufficient amount of base, preferably urea or ammonium hydroxide, is then introduced into the mixture to precipitate substantially all of the metal in the form of its hydroxide. The zirconium and metal materials are then recovered and calcined to produce particles of zirconia coated with the metal oxide. In another such embodiment, a particulate mixture of zirconia with at least one of yttria, magnesia, or calcia is produced by providing an aqueous acidic solution of zirconyl chloride and a metal salt of magnesium, calcium, yttrium, or a mixture of these salts, wherein the concentration of zirconyl chloride provides a molarity up to about 0.4; heating the solution at conditions as described above to generate solid particles of hydrated zirconium oxide; introducing a sufficient amount of base into the solution to precipitate substantially all of said metal in the form of its hydroxide; recovering the zirconium and metal materials; and calcining the recovered material at a temperature of at least about 400° C. to produce a powder wherein the powder particles are substantially spherical and the particles have a mean particle size of about 0.05–0.2 micron with a geometric standard deviation of about 30% or less.

The method of this invention, therefore, produces sub-micron powders of zirconia or mixtures of zirconia with one or more of its stabilizing metal oxides, without the need for grinding or milling. The powders are substantially spherical and in narrow particle size cuts, providing excellent packing, pressing, or tape casting capability for the final shaping/sintering steps in the production of strong and durable ceramic or refractory articles.

DETAILED DESCRIPTION OF THE INVENTION

According to the present invention, zirconia powders of excellent morphology are provided by the forced hydrolysis of zirconyl chloride at heating conditions that are equivalent to, or more severe than, heating at 95° C. for 72 hours. It has been found that heating an aqueous solution of zirconyl chloride of particular molarity at these conditions produces substantially spherical particles of about 0.05–0.2 micron size.

In the conduct of the present invention, an aqueous solution of zirconyl chloride, having molarity of up to about 0.4, is heated at a temperature of at least 95° C. for a period of at least 72 hours, preferably at least about 120 hours. As those skilled in the art will recognize, however, heating conditions of substantially equivalent severity can be imposed on the system with one of the heating parameters below that stated if a corresponding increase in the other is effected. For example, it is possible to heat at a temperature below 95° C. if a period greater than 72 hours is used, or to heat at a temperature greater than 95° C., in which case less than 72 hours of treatment is required. It is important, however, that the heating conditions chosen be at least as severe as those imposed by heating at 95° C. for 72 hours. Preferred conditions are heating at approximately 98° C. for about 120 hours, particularly in a closed system such as at reflux conditions.

The starting zirconyl chloride solution is prepared by mixing zirconyl chloride in water, preferably distilled or de-ionized water, in an amount sufficient to provide a molarity of up to about 0.4. Preferably, the zirconyl chloride concentration provides molarity of about 0.2. Aqueous solutions of zirconyl chloride are inherently acidic, with, for example, a 0.2 molar solution providing a pH of about 1.5. It is preferred to perform the hydrolysis at a pH below about 3, preferably in the range of about 1–2. Starting zirconyl chloride solutions that are too dilute to provide a pH within the stated range can be further acidified by the addition of such acids as hydrochloric acid or nitric acid.

The zirconyl chloride used to prepare the starting solution is preferably high-purity reagent grade $ZrOCl_2.8H_2O$, available, for example, from Teledyne Corporation, although standard technical grade $ZrOCl_2$ solution can be used as well. It has been found, however, that the somewhat higher level of sodium ion impurity in the technical grade can inhibit the growth or effect the shape of the particles generated by the hydrolysis. Furthermore, the presence of the sodium ion impurity can create flaws in the crystalline structure of final products of stabilized or unstabilized zirconia. For these reasons, the reagent grade starting material is preferred.

Heating the solution as described above hydrolyzes the zirconyl chloride and generates solid particles of hydrated zirconium oxide in the system. At the conclusion of the hydrolysis reaction, the particles, which generally remain suspended in the liquid medium are substantially spherical in shape and have a mean (number) particle size in the range of about 0.05–0.2 micron, preferably 0.1–0.2 micron, with a geometric standard deviation of no greater than about 30%, preferably no greater than about 20%. The suspended particles are actually agglomerates of even smaller units having a primary particle size of about 50 angstroms. It has been found that the size of these precipitated agglomerate particles increases with an increase in the molarity of the starting zirconyl chloride solution, up to a molarity of about 0.2. For example, a 0.05 molar solution hydrolyzed at 98° C. for 72 hours produces particles having a mean size of about 0.07 micron whereas a 0.2 molar solution generates particles having a mean size of about 0.2 micron. Particle sizes can be measured by scanning electron microscopy, through which particle size itself, and the particle morphology and any agglomeration, can be observed.

At the completion of the hydrolysis, the suspended particles are recovered by conventional means such as filtration, or preferably, centrifugation, followed by washing. The moist cake resulting from this operation is preferably dried in an oven at a temperature up to about 150° C., and is then calcined at a temperature of at least about 400° C. for 2–24 hours, preferably in an oxidizing atmosphere. During the calcination step, zirconia itself is generated from the hydrated zirconium oxide material and any organic impurities in the material are burned-off. Following calcining, the material is in the form of a dry, finely divided powder having the characteristics described above. It is preferred to calcine the material at a temperature of at least about 600° C. At such temperatures, the primary particles within each of the agglomerated particles of the powder are caused to partially sinter and densify, which can lead to a reduction in size of up to 20%, with a corresponding increase in density, of the agglomerated particles. Accordingly, the zirconia powder resulting from the calcination consists of dense, substantially spherical, particles within the 0.05–0.2 micron size range defined above.

In preferred embodiments of the invention, the zirconia powders are produced with a surface coating of another metal oxide by precipitating the metal oxide, in the form of its hydroxide, out of a solution and onto the zirconia particles. Although virtually any metal oxide can be co-produced with the zirconia, most useful are the oxides of calcium, magnesium, and yttrium, which are known to stabilize zirconia in its cubic form.

These composite powders can be prepared by either of two methods. In the first such method, the desired metal, or combination of metals, in the form of the respective metal salt, is introduced into the starting zirconyl chloride solution. Generally, any salt can be used but examples of preferred salts are nitrates, carbonates, and acetates, and in the case of yttrium, the chloride salt as well. The amount of metal salt added to the solution is that which, after precipitation and calcining, will generate an amount of corresponding metal oxide, relative to the zirconia, sufficient to wholly or partially stabilize the zirconia. Zirconia is "wholly" or "partially" stabilized depending upon whether the amount of stabilizer is sufficient to form a cubic phase solid solution with all or part of the zirconia. For calcia, as little as 4 weight percent, based on the total calcia and zirconia weight, is sufficient to partially stabilize the zirconia and as much as 10 weight percent may be needed to fully stabilize it. For magnesium and yttria, those corresponding ranges are 3–21% by weight and 4–16% by weight, respectively.

The solution of zirconyl chloride and other metal salt is heated, according to the conditions described earlier, to generate particles of hydrated zirconium oxide suspended in the liquid medium, after which the system is cooled to room temperature. To the system is then added a base in an amount sufficient to raise the pH of the system to a level at which the added metal will precipitate in the form of its hydroxide. Any base that will not introduce impurities into the system can be used. For example, sodium hydroxide should generally be avoided because of its tendency to introduce soda impurities. Preferred bases are organic bases such as urea and ammonium hydroxide. Other amine bases can be used as well. The amount of base compound added to the system depends not only on the identity of the stabilizing metal to be precipitated, but also on the amount of that metal initially present in the zirconyl chloride solution and the starting pH of that solution. More particularly, the base should be added in an amount sufficient to neutralize the acid in the solution, such as HCl liberated from the zirconyl chloride, and to quantitatively precipitate the stabilizing metal. Preferably the base is added in an excess quantity, which for slow-acting bases like urea can be as high as 100% excess. The system can be, and preferably is, heated to initiate the precipitation of the stabilizing metal. In the conduct of this embodiment of the method, the precipitation is effected, depending on the metal to be precipitated, as the pH of the system rises to the appropriate level, which for yttrium hydroxide is at least about 6.5, and for calcium hydroxide and magnesium hydroxide is at least about 11.

The presence of the previously-formed hydrated zirconium oxide particles, suspended in the system provides nucleation sites for the precipitation of the other hydrated metal oxide. Accordingly, although some discrete solid particles of hydrated metal oxide can be generated, that material in general precipitates on the existing zirconium-containing particles. At the conclusion of this precipitation, therefore, the resultant suspension consists essentially of substantially spherical composite particles of hydrated zirconium oxide with a surface coating of the hydrated metal oxide. The particles are recovered and calcined, as described earlier, to provide a composite particle of zirconia having a coating of the other metal oxide. Because the amount of stabilizing metal oxide relative to the zirconia is generally low, the composite particles provided after calcination are normally within the size range defined earlier for the "pure" zirconia particles.

According to a second, more preferred, method of producing the composite particles, the calcined particles of "pure" zirconia prepared as described earlier are suspended in an aqueous acidic solution of a salt of the desired metal. The pH of the solution is preferably adjusted to a level of about 3.0 or below to keep the salt dissolved. The metal salts that can be used, and the amounts of those salts, are the same as those described with respect to the first method for making the composite particles. As in that first embodiment, a base, preferably urea or ammonium hydroxide, is added to the system in an amount sufficient to raise the pH to the appropriate level and to precipitate substantially all the metal in the form of its hydroxide. The precipitation is conducted as described above to provide a suspension of substantially spherical composite particles of zirconia with a surface coating of the metal hydroxide. The particles are recovered as described earlier and calcined to generate the actual metal oxide, providing composite particles of zirconia having a surface coating of the metal oxide. The particles are substantially spherical and have a mean particle size of about 0.05–0.2 micron with a geometric standard deviation of less than about 30%.

The powders made according to the methods of the invention, whether "pure" zirconia or composite particles of zirconia with another metal oxide, can be pressed or molded and then sintered in the conventional manner to produce refractory articles of stabilized or unstabilized zirconia. It has also been found that the particles can be easily tape cast, vacuum cast, or electrophoretically deposited from an aqueous slip, prepared by dispersing the particles in water. In preferred embodiments, the aqueous slips are prepared by dispersing powders that have been calcined at temperatures of at least about 600° C. in water that has been acidified to a pH of about 1–3. Molded articles can be made from the slips also by, for example, centrifuging the slips in plastic molds. Following centrifugation, excess water is decanted, the solid material air-dried, and the resultant green shape then sintered using a conventional firing schedule.

The following examples are illustrative, but not limiting, of the present invention.

EXAMPLE 1

A two-liter portion of a 0.2 molar solution of reagent-grade zirconyl chloride in de-ionized water was heated under reflux conditions for 120 hours at 98° C. The resulting particulate solid material was settled by centrifugation and the excess liquid decanted. The solid material was then washed with deionized water and then with isopropyl alcohol, followed by drying at 100° C. The dried material was calcined at 600° C. The resulting powder particles were determined by scanning electron microscopy to be substantially spherical in shape and to have a particle size of about 0.2 micron. X-ray diffraction showed the particles to consist mainly of monoclinic zirconia with a trace of tetragonal crystalline phase present.

EXAMPLE 2

Into one liter of distilled water were added 64.4 grams of $ZrOCl_2.8H_2O$ and 7.9 grams of $YCl_3.6H_2O$. The resultant solution was heated at 98° C. for 120 hours, after which the resulting milky suspension was cooled to room temperature. To this suspension was added 64.0 grams of urea and the suspension was reheated to 98° C. and there maintained until the pH was determined to have exceeded a level of 6.5. Solid materials were recovered from the suspension by centrifugation, washed, and then dried at 100° C. The dried materials were then calcined at 600° C., providing a fine powder which was determined by scanning electron microscopy and transmission electron microscopy to be substantially spherical and to have an average particle size of about 0.2 micron.

A batch of these powders was dry pressed and sintered at 1650° C., although the products did not achieve high density. Another batch of the same powders was dispersed in distilled water, which had been acidified to a pH of about 1.5 with hydrochloric acid, to make an aqueous slip. The slip was centrifuged at 10,000 rpm in a plastic mold. Excess water remaining after centrifugation was decanted and the molded solid material was air dried, followed by sintering at 1550° C. in air. X-ray diffraction showed the material to be mostly cubic-stabilized zirconia and density of the sintered product was 5.978 gm/cc (as compared to a theoretical density of 6.00 gm/cc).

What is claimed is:

1. A method of producing zirconia in the form of substantially spherical powder particles, said particles having a mean particle size of about 0.05–0.2 micron with a geometric standard deviation of up to about 30% comprising:
   (a) providing an aqueous solution of zirconyl chloride having a molarity up to about 0.4;
   (b) heating the solution at conditions substantially equivalent to heating at a temperature at least about 95° C. for a period of at least about 72 hours to generate solid particles of hydrated zirconium oxide;

(c) recovering the solid material; and (d) calcining the recovered material at a temperature of at least about 400° C.

2. The method of claim 1 in which the zirconyl chloride solution has a molarity of up to about 0.2; the heating step is conducted at conditions substantially equivalent to a temperature of at least 95° C. for a period of at least 120 hours; and the calcining step is conducted at a temperature of at least about 600° C.

3. The method of claim 1 which includes the additional steps, in order, of (e) providing an aqueous acidic solution of a salt of a metal selected from the group consisting of magnesium, calcium, yttrium, and mixtures of these;

(f) introducing the calcined material of step (d) to the solution;

(g) introducing a sufficient amount of base into the solution to precipitate substantially all of said metal in the form of its hydroxide;

(h) recovering the zirconium and metal hydroxide materials; and (i) calcining the recovered materials.

4. The method of claim 3 in which the zirconyl chloride solution has a molarity of up to about 0.2; the heating step is conducted at conditions substantially equivalent to a temperature of at least 95° C. for a period of at least 120 hours; and the calcining step is conducted at a temperature of at least about 600° C.; and the base is urea or ammonium hydroxide.

5. The method of claim 3 in which the metal salt is a salt of hydrochloric acid, nitric acid, or acetic acid.

6. The method of claim 4 in which the metal salt is a salt of hydrochloric acid, nitric acid, or acetic acid.

7. The method of claim 4 in which the metal salt is yttrium chloride, and the zirconyl chloride solution has a molarity of about 0.2.

8. A method of producing a mixture of zirconia with at least one of yttria, magnesia, or calcia, said mixture being in the form of substantially spherical powder particles having a mean particle size of about 0.05–0.2 micron with a geometric standard deviation of up to about 30% comprising:

(a) providing an aqueous acidic solution of zirconyl chloride and a salt of a metal selected from the group consisting of magnesium, calcium, yttrium and mixtures of these wherein the concentration of zirconyl chloride provides a molarity up to about 0.4;

(b) heating the solution at conditions substantially equivalent to heating at a temperature of at least about 95° C. for a period of at least about 72 hours to generate solid particles of hydrated zirconium oxide;

(c) introducing a sufficient amount of base into the solution to precipitate substantially all of said metal in the form of its hydroxide;

(d) recovering the zirconium and metal hydroxide materials; and (e) calcining the recovered materials at a temperature of at least about 400° C.

9. The method of claim 8 in which the metal salt is a salt of hydrochloric acid, nitric acid, or acetic acid.

10. The method of claim 8 in which the zirconyl chloride concentration provides a molarity of up to about 0.2; the heating step is conducted at conditions substantially equivalent to a temperature of at least about 95° C. for a period of at least about 120 hours; the calcining step is conducted at a temperature of at least about 600° C.; and the base is urea or ammonium hydroxide.

11. The method of claim 10 in which the metal salt is a salt of hydrochloric acid, nitric acid, or acetic acid.

12. The method of claim 10 in which the metal salt is yttrium chloride, and the zirconyl chloride concentration provides a molarity of about 0.2.

* * * * *